United States Patent
Nagarajan (10) Patent No.: US 10,955,811 B2
(45) Date of Patent: Mar. 23, 2021

(54) ROBOT INTERACTION WITH OBJECTS BASED ON SEMANTIC INFORMATION ASSOCIATED WITH EMBEDDING SPACES

(71) Applicant: X Development LLC, Mountain View, CA (US)

(72) Inventor: Umashankar Nagarajan, Santa Clara, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 16/932,502

(22) Filed: Jul. 17, 2020

(65) Prior Publication Data

US 2020/0348642 A1 Nov. 5, 2020

Related U.S. Application Data

(63) Continuation of application No. 15/851,622, filed on Dec. 21, 2017, now Pat. No. 10,754,318.

(51) Int. Cl.
*G05B 19/12* (2006.01)
*G05B 13/02* (2006.01)
(Continued)

(52) U.S. Cl.
CPC ............ *G05B 19/124* (2013.01); *B25J 9/161* (2013.01); *B25J 9/163* (2013.01); *B25J 9/1612* (2013.01);
(Continued)

(58) Field of Classification Search
CPC ........ G06N 3/08; G06N 20/00; G06N 3/0454; G05D 1/0088; G10L 15/22; B25J 5/007;
(Continued)

(56) References Cited

U.S. PATENT DOCUMENTS 6,650,965 B2 11/2003 Takagi et al.
6,718,231 B2 4/2004 Konno et al.
(Continued)

OTHER PUBLICATIONS

Chandarr et al., A novel multi modal tracking method based on depth and semantic color features for human robot interaction, 2015, IEEE, p. 369-372 (Year: 2015).*
(Continued)

*Primary Examiner* — Marc McDieunel
(74) *Attorney, Agent, or Firm* — Middleton Reutlinger (57) ABSTRACT

Techniques described herein relate to using reduced-dimensionality embeddings generated from robot sensor data to identify predetermined semantic labels that guide robot interaction with objects. In various implementations, obtaining, from one or more sensors of a robot, sensor data that includes data indicative of an object observed in an environment in which the robot operates. The sensor data may be processed utilizing a first trained machine learning model to generate a first embedded feature vector that maps the data indicative of the object to an embedding space. Nearest neighbor(s) of the first embedded feature vector may be identified in the embedding space. Semantic label(s) may be identified based on the nearest neighbor(s). A given grasp option may be selected from enumerated grasp options previously associated with the semantic label(s). The robot may be operated to interact with the object based on the pose and using the given grasp option.

20 Claims, 6 Drawing Sheets

(51) Int. Cl.
  *G05B 19/402* (2006.01)
  *B25J 9/16* (2006.01)
  *G06K 7/00* (2006.01)
(52) U.S. Cl.
  CPC ........ *G05B 13/0265* (2013.01); *G05B 19/402* (2013.01); *G06K 7/0004* (2013.01); *G05B 2219/23189* (2013.01); *G05B 2219/36371* (2013.01); *G05B 2219/39505* (2013.01)
(58) Field of Classification Search
  CPC .......... B25J 9/161; B25J 9/163; B25J 9/1612; G06F 40/30; H04N 21/4223; A63F 13/211; A63F 13/212; Y10S 901/08; G05B 19/124; G05B 13/0265; G05B 19/402; G05B 2219/23189; G05B 2219/39505; G06K 7/0004
  See application file for complete search history.

(56) References Cited

U.S. PATENT DOCUMENTS

| | | | |
|---|---|---|---|
| 6,889,118 B2 | 5/2005 | Murray et al. | |
| 6,952,629 B2 | 10/2005 | Takamura et al. | |
| 7,299,110 B2 | 11/2007 | Gupta et al. | |
| 7,620,477 B2 | 11/2009 | Bruemmer | |
| 7,668,621 B2 | 2/2010 | Bruemmer | |
| 9,669,543 B1 | 6/2017 | Stubbs et al. | |
| 9,754,490 B2 | 9/2017 | Kentley et al. | |
| 9,873,199 B2 | 1/2018 | Wellman et al. | |
| 9,914,213 B2* | 3/2018 | Vijayanarasimhan | ... G06N 3/08 |
| 10,207,402 B2* | 2/2019 | Levine | ...... G06N 3/08 |
| 10,754,318 B2* | 8/2020 | Nagarajan | ............ G05B 19/402 |
| 2016/0101519 A1 | 4/2016 | Kopicki | |
| 2016/0221187 A1 | 8/2016 | Bradski et al. | |
| 2016/0243701 A1 | 8/2016 | Gildert et al. | |
| 2016/0297068 A1 | 10/2016 | Thibodeau et al. | |
| 2017/0024877 A1 | 1/2017 | Versace et al. | |
| 2017/0252924 A1* | 9/2017 | Vijayanarasimhan | ....................... G06N 3/0454 |
| 2017/0305014 A1 | 10/2017 | Gildert | |
| 2018/0364731 A1 | 12/2018 | Liu et al. | |
| 2019/0001489 A1* | 1/2019 | Hudson | ................. G06N 3/0454 |
| 2019/0005374 A1* | 1/2019 | Shankar | .................. G06N 3/084 |
| 2019/0084151 A1 | 3/2019 | Bai et al. | |
| 2019/0196436 A1* | 6/2019 | Nagarajan | ............ G05B 19/402 |
| 2019/0247662 A1* | 8/2019 | Poltroak | ................ A61B 5/246 |
| 2019/0337152 A1 | 11/2019 | Homberg et al. | |
| 2019/0361672 A1 | 11/2019 | Odhner et al. | |
| 2020/0094405 A1 | 3/2020 | Davidson et al. | |
| 2020/0114506 A1* | 4/2020 | Toshev | ................... B25J 9/1697 |

OTHER PUBLICATIONS

Aydemir et al., Search in the real world: Active visual object search based on spatial relations, 2011, IEEE, p. 2818-2824 (Year: 2011).*
Worgotter et al., A Simple Ontology of Manipulation Actions Based on Hand-Object Relations, 2013, IEEE, p. 117-134 (Year: 2013).*
Stiefelhagen et al., Enabling Multimodal Human—Robot Interaction for the Karlsruhe Humanoid Robot, 2007, IEEE, p. 840-851 (Year: 2007).*
Barck-Holst, C. et al. "Learning grasping affordance using probabilistic and ontological approaches." Advanced Robotics, 2009. ICAR 2009. International Conference on. IEEE; 6 pages; (2009).
Herzog, A. et al. "Template-based learning of grasp selection." In Robotics and Automation (ICRA), IEEE International Conference on. IEEE; pp. 2379-2384; (2012). Jan. 1, 2012.
Huebner, K. et al. "Grasping known objects with humanoid robots: A box-based approach." Advanced Robotics, 2009. ICAR 2009. International Conference on. IEEE; 6 pages; (2009).
Nguyen, A. et al. "Detecting object affordances with convolutional neural networks." Intelligent Robots and Systems (IROS), 2016 IEEE/RSJ International Conference on. IEEE; 7 pages; (2016).

Redmon, J. et al. "Real-Time Grasp Detection Using Convolutional Neural Networks." arXiv:1412.3128v2 [cs.RO]; 7 pages; Feb. 28, 2015.
Song, D. et al. "Learning task constraints for robot grasping using graphical models." Intelligent Robots and Systems (IROS), 2010 IEEE/RSJ International Conference on. IEEE; 8 pages; (2010).
Song, H. et al. "Visual grasp affordances from appearance-based cues." Computer Vision Workshops (ICCV Workshops), 2011 IEEE International Conference on. IEEE; 10 pages; (2011).
Stückler, J. et al. "Efficient 3D object perception and grasp planning for mobile manipulation in domestic environments." Robotics and Autonomous Systems 61.10; pp. 1106-1115; (2013).
Levine et al.; Learning Hand-Eye Cordination for Robotic Grasping with Deep Learning and Large-Scale Data Collection; International Journal of Robotics Research; vol. 37, No. 4-5; pp. 421-436; dated Jun. 12, 2017.
Okun, O. et al. "Supervised Locally Linear Embedding Algorithm;" Proceedings of the 10th Finnish Artificial Intelligence Conference (Step-2002), pp. 50-61; Dec. 15, 2002.
Alpaydin, E. "Introduction to Machine Learning" Second Edition, Chapter 6 "Dimensionality Reduction," The MIT Press; pp. 109-142 2010.
De Ridder, D. et al. "Supervised Locally Linear Embedding;" Proc. Int. Conf. Adv. Biometrics (ICB); [Lecture Notes in Computer Science] vol. 2714; pp. 333-341; Jan. 1, 2003.
Roweis, S. et al. "Nonlinear Dimensionality Reduction by Locally Linear Embedding;" American Association for the Advancement of Science, vol. 290, No. 5500; pp. 2323-2326; Dec. 22, 2000.
European Patent Office, International Search Report and Written Opinion of PCT Ser. No. PCT/US2018/066501, 16 pages, dated Mar. 29, 2019.
Bucher, M. et al. "Improving semantic embedding consistency by metric learning for zero-shot classification." European Conference on Computer Vision. Springer International Publishing, 2016; 17 pages.
Cai, et al. "Understanding Hand-Object Manipulation with Grasp Types and Object Attributes." Robotics: Science and Systems. 2016; 10 pages.
Dang, et al. "Semantic grasping: Planning robotic grasps functionally suitable for an object manipulation task." Intelligent Robots and Systems (IROS), 2012 IEEE/RSJ International Conference on. IEEE, 2012; 7 pages.
Dang et al. "Semantic grasping: planning task-specific stable robotic grasps." Autonomous Robots 37.3 (2014): 301-316.
Frome, Andrea, et al. "Devise: A deep visual-semantic embedding model." Advances in neural information processing systems. 2013; 11 pages.
Jang, E. et al. "End-to-End Learning of Semantic Grasping." arXiv preprint arXiv:1707.01932 (2017); 14 pages.
Jin, L. et al. "Object Detection Free Instance Segmentation With Labeling Transformations." arXiv preprint arXiv:1611.08991 (2016); 10 pages.
Kappler, D. et al. "Representation of pre-grasp strategies for object manipulation." Humanoid Robots (Humanoids), 2010 10th IEEE-RAS International Conference on. IEEE, 2010; 8 pages.
Kehoe et al. "Cloud-Based Robot Grasping with the Google Object Recognition Engine." Robotics and Automation (ICRA), 2013 IEEE International Conference on. IEEE, 2013. 7 pages.
Lenz, I. et al.; Deep Learning for Detecting Robotic Grasps; The International Journal of Robotics Research; 17 Pages; 2015.
Mahler et al. "Dex-net 1.0: A Cloud-Based Network Of 3D Objects For Robust Grasp Planning Using A Multi-Armed Bandit Model With Correlated Rewards." In Robotics and Automation (ICRA), 2016 IEEE International Conference, pp. 1957-1964.
Movshovitz-Attias, Yair, et al. "No Fuss Distance Metric Learning using Proxies." arXiv preprint arXiv:1703.07464 (2017); 9 pages.
Redmon, Joseph, and Anelia Angelova. "Real-Time Grasp Detection Using Convolutional Neural Networks." arXiv preprint arXiv:1412.3128 (2014).
Romero, J., et al. "Human-to-robot mapping of grasps." Proceedings of IEEE/RSJ International Conference on Intelligent Robots and Systems, WS on Grasp and Task Learning by Imitation. 2008; 8 pages.

(56) References Cited

OTHER PUBLICATIONS

Sandouk, U., et al. "Multi-label zero-shot learning via concept embedding." arXiv preprint arXiv:1606.00282 (2016); 15 pages.
Spiers, A., et al. "Single-Grasp Object Classification and Feature Extraction with Simple Robot Hands and Tactile Sensors." IEEE transactions on haptics 9.2 (2016): 207-220.
Szegedy, C. et al. "Deep Neural Networks For Object Detection." In Advances in Neural Information Processing Systems, pp. 2553-2561. 2013.
Toshev, A. et al. "Shape representations for object recognition." A Dissertation in Computer and Information Science; University of Pennsylvania; 2011; 195 pages.
Tsoli, A., et al. "Neighborhood denoising for learning high-dimensional grasping manifolds." Intelligent Robots and Systems, 2008. IROS 2008. IEEE/RSJ International Conference on. IEEE, 2008; 6 pages.
Tsoli, A., et al. "Sparse Control of Robot Grasping from 2D Subspaces." Proceedings of the 28th Annual International Conf. of the IEEE Engineering in Medicine and Biology Society (EMBS'06). 2006; 6 pages.
Wang, Z. et al. "Robot grasp detection using multimodal deep convolutional neural networks." Advances in Mechanical Engineering 8.9 (2016): XP055511783, ISSN:1687-8140, DOI: 10.1177/1687814016668077; 12 pages.
Zhang, L. et al. "Grasp evaluation with graspable feature matching." RSS Workshop on Mobile Manipulation: Learning to Manipulate. 2011; 6 pages.
Zhang, X. et al. "Learning Spread-out Local Feature Descriptors." arXiv preprint arXiv:1708.06320 (2017); 9 pages.
European Patent Office; International Search Report and Written Opinion of Ser. No. PCT/US2019/012147; 15 pages; dated May 20, 2019.
Mittendorfer et al., A General Tactile Approach for Grasping Unknown Objects with a Humanoid Robot, 2013, IEEE, p. 4747-4752.
Cleveland et al., Automated System for Semantic Object Labeling With Soft-Object Recognition and Dynamic Programming Segmentation, 2016, IEEE, p. 820-833.
Cleveland et al., An Automated System for Semantic Object Labeling With Soft-Object Recognition and Dynamic Programming Segmentation, 2015, IEEE, p. 683-690.
Mason et al., An object-based semantic world model for long-term change detection and semantic querying, 2012, IEEE, p. 38513858.

\* cited by examiner

```
┌─────────────────────────────────────────────────────────────────────┐
│ OBTAIN, FROM ONE OR MORE SENSORS OF A ROBOT, SENSOR DATA THAT       │
│ INCLUDES DATA INDICATIVE OF AN OBJECT OBSERVED IN AN ENVIRONMENT    │
│ IN WHICH THE ROBOT OPERATES                                         │
│ 502                                                                 │
└─────────────────────────────────────────────────────────────────────┘
                                  ↓
┌─────────────────────────────────────────────────────────────────────┐
│ PROCESS ONE OR MORE OF THE INPUTS UTILIZING A FIRST TRAINED MACHINE │
│ LEARNING MODEL TO GENERATE A FIRST EMBEDDED FEATURE VECTOR, WHEREIN │
│ THE FIRST EMBEDDED FEATURE VECTOR MAPS THE DATA INDICATIVE OF THE   │
│ OBJECT TO AN EMBEDDING SPACE                                        │
│ 504                                                                 │
└─────────────────────────────────────────────────────────────────────┘
                                  ↓
┌─────────────────────────────────────────────────────────────────────┐
│ IDENTIFY, FOR THE FIRST EMBEDDED FEATURE VECTOR, AT LEAST ONE       │
│ NEAREST NEIGHBOR IN THE EMBEDDING SPACE                             │
│ 506                                                                 │
└─────────────────────────────────────────────────────────────────────┘
                                  ↓
┌─────────────────────────────────────────────────────────────────────┐
│ IDENTIFY ONE OR MORE SEMANTIC LABELS BASED AT LEAST IN PART ON THE  │
│ AT LEAST ONE NEAREST NEIGHBOR                                       │
│ 508                                                                 │
└─────────────────────────────────────────────────────────────────────┘
                                  ↓
┌─────────────────────────────────────────────────────────────────────┐
│ SELECT A GIVEN GRASP OPTION FROM ONE OR MORE ENUMERATED GRASP       │
│ OPTIONS PREVIOUSLY ASSOCIATED WITH THE POSE                         │
│ 510                                                                 │
└─────────────────────────────────────────────────────────────────────┘
                                  ↓
┌─────────────────────────────────────────────────────────────────────┐
│ OPERATE THE ROBOT TO INTERACT WITH THE OBJECT BASED ON THE POSE AND │
│ USING THE GIVEN GRASP OPTION                                        │
│ 512                                                                 │
└─────────────────────────────────────────────────────────────────────┘
```

Fig. 6

ROBOT INTERACTION WITH OBJECTS BASED ON SEMANTIC INFORMATION ASSOCIATED WITH EMBEDDING SPACES

BACKGROUND

Robot grasping is a challenging aspect of robotics. On the one hand, it is desirable that robots be flexible enough to interact with a variety of different types of objects, such as door knobs, dishes, glasses, tools, etc. On the other hand, different types of objects require different types of grasps. Moreover, a state of an object, such as a pose of the object, a configuration of the object (e.g., does a cup have a lid?), can also influence how, or even whether, the object should be grasped by a robot. A variety of different techniques exist for determining how a robot should grasp objects. Many of these, however, are computationally complex, often because they evaluate large search spaces and/or use brute force approaches to determine how to grasp objects. For example, given the myriad different varieties of objects with which a robot may interact, the search space for determining an appropriate grasp may be large, requiring extensive computing resources (e.g., processing cycles, memory, etc.) and/or time to select an appropriate grasp.

SUMMARY

The present disclosure is generally directed to methods, apparatus, and computer-readable media (transitory and non-transitory) for using reduced-dimensionality embeddings generated from sensor data captured by a robot to identify predetermined semantic labels that guide robot interaction with objects. Put another way, techniques described herein leverage object embedding spaces that are, at least in part, indexed with semantic information that is usable to make decisions regarding how robots should interact with objects. These predetermined semantic labels may be used to select, for instance, a manner in which a robot will grasp an object. By leveraging semantic labels previously-assigned to object types that are commonly interacted with by robots, it is possible to "fast track" grasp selection.

In various implementations, vision frame(s) captured by one or more vision sensors of a vision component of a robot may take various forms. Some vision sensors are configured to capture RGB-D data. Additionally or alternatively, some vision sensors are configured to captured "point cloud" data indicative of a three-dimensional environment. Examples of vision sensors include stereographic cameras, RGB-D cameras, laser scanners, etc. Of particular relevance to the present disclosure, each vision frame may include one or more depictions of one or more objects captured in the vision frame.

In various implementations, the vision frames may be processed as input using one or more trained machine learning models (or "classifiers") to generate embedded feature vectors, which are also referred to herein as "embeddings." In various implementations, the embedded feature vectors may map depictions of objects contained in the vision frame(s) to an embedding space. Consequently, it may be possible to determine various attributes of depicted objects based on their embeddings, as well as their embeddings' proximities to other embeddings (i.e. nearest neighbors) in the embedding space.

Suppose a machine learning model is trained, e.g., using training data that includes vision frames labeled with object type classifications, to generate an embedded feature vector in an embedding space that is associated with object types. If an object depicted in the input vision frame is a chair, then the generated embedded feature vector may be embedded in relatively close proximity to (e.g., measured using Euclidean distance, dot products, cosine similarities, etc.) other embeddings associated with the object type of "chair." By contrast, the generated embedded feature vector may be relatively distant in the embedding space from embeddings associated with other, non-chair-like objects. By determining the embedded feature vector's nearest neighbors, for example, it is possible to determine an object type classification of the depicted object.

In some implementations, various attributes (or classifications) of a depicted object may be determined in addition to or instead of the object's type. For example, different types of objects can have different types of "poses," or physical arrangements relative to their environment. A cup can be standing upright, upside down, or tipped over. A coffee mug may have similar poses as a handle-less cup, as well as an orientation of its handle (which may be a potential grasping point for a robot). In various implementations, these additional attributes may also be determined using one or more machine learning models. For example, in some implementations, the same machine learning model used to generate the embedded feature vector may be trained to also generate output indicative of the depicted object's pose, e.g., as part of the same embedding.

For example, a given embedding generated from a tipped over cup may be proximate a cluster of other cup embeddings in an embedding space. Further, within that cluster of cup embeddings, the given embedding may be most proximate to cup embeddings generated from other tipped over cups. Consequently, by evaluating one or more nearest neighbors (or averages of x nearest neighbors, wherein x>0) to the given embedding in the embedding space, it is possible to determine both that the depicted object is a cup and that the depicted cup has a tipped over pose.

Additionally or alternatively, in other implementations, a determination made from generating an embedded feature vector may lead to selection of another machine learning model that can be used to determine various attributes of an object. For example, in some implementations, a first embedded feature vector generated based on a first machine learning model may be used to identify an object type classification of an object, e.g., based on semantic labels previously assigned to its nearest neighbors in object type classification embedding space. Based on the object type classification, one or more additional machine learning models may be selected and applied to determine additional attributes of the depicted object besides its object type classification.

Suppose the depicted object is an upright cup filled with liquid and no top. A first machine learning model may be used to generate a first embedded feature vector in an object type classification embedding space. This first embedding feature vector may be most proximate to other embeddings semantically labeled as cups, thereby enabling the object to be classified generally as a cup. Next, based on the classification of "cup," one or more additional trained machine learning models that are applicable in the context of cups may be selected from a library of candidate trained machine learning models and used, with the first embedded feature vector or even with the original vision frame as input, to determine additional attributes.

For example, one selected machine learning model may generate output in the form of a second feature vector embedding within a second embedding space associated with whether objects are full or empty. Thus, in this example, the second embedding feature vector may be most proximate to other embeddings in the second embedding space that are associated with previously-assigned semantic labels of "full." Another selected machine learning model may generate output in the form of a third feature vector embedding within a third feature embedding space associated with whether objects (e.g., cups, bottles, drawers, boxes, etc.) are open at the top. Thus, in this example, the third embedding feature vector may be most proximate to other embeddings in the third embedding space that are associated with previously-assigned semantic labels of "open."

In various implementations, various embedding spaces may effectively be "indexed" (i.e., organized, classified) with semantic labels assigned to specific embeddings and/or relationships between multiple embeddings (e.g., an average of multiple embedding points in a cluster). By identifying nearest neighbor(s) to a given embedding, it is therefore possible to associate information from the previously-assigned semantic labels to the object used to generate the given embedding. Semantic labels assigned to embedding spaces (e.g., to specific embeddings, to embedding averages such as centroids, to embedding regions, etc.) may include other information besides potential object attributes. For example, in some implementations, semantic labels may include candidate grasp options that may be employed by a robot to interact with a given object.

Continuing with the example described previously, one or more nearest neighbors to the second embedded feature vector in the second embedding space—which was used to identify the cup as being full—may have previously-assigned semantic labels that provide a first set of one or more grasp options compatible with objects that are full. For example, it may be preferable to grab a full cup from the side, rather than from top by grabbing across a full diameter of the cup or by pinching a lip of the cup, which might result in the robot dropping the potentially unbalanced and/or heavy full cup. Likewise, one or more nearest neighbors to the third embedded feature vector in the third embedding space—which was used to identify the cup as lacking a top—may have previously-assigned semantic labels that provide a second set of one or more grasp options compatible with objects that are open at the top. For example, a cup that is open at the top may be graspable from the top by pinching its lip, but also may be graspable from the side or from the top by grabbing across the top diameter of the cup. In some implementations, an intersection of the first and second sets of grasp options may be used by a robot to select a suitable grasp option for grasping the full cup with an open top. Thus, in this example, a robot may grasp the cup from the side, as that is the only grasping option identified by the various semantic labels as suitable for grasping both open cups and full cups.

Techniques described herein may give rise to a variety of technical advantages. Indexing embedding spaces with semantic labels (e.g., assigning semantic labels to specific embeddings, combinations of embeddings, and/or regions in the embedding space) may facilitate reliance on the semantic labels to expedite robot decisions, such as selecting from one or more grasp options for an object of interest. Relying on previously-assigned semantic labels may be computationally inexpensive relative to other techniques for determining robot grasp for an object of interest. This may be particularly beneficial when interacting with objects that are common and/or interacted with by robots often, as the semantic labels may be effectively used as "shortcuts" in place of computationally-expensive grasp determination techniques. For example, using techniques described herein, robots may be able to make quick decisions about interacting with well-known objects in well-known poses/configurations because of the semantic labels previously assigned to such well-known objects.

In addition, in implementations in which a pipeline of machine learning models are employed to make a plurality of classifications about an object of interest—e.g., object type→object pose→object configuration), the potentially enormous search space is reduced based on upstream classifications. Robots that take advantage of techniques described herein (either themselves or via delegation to a cloud-based classification system) are therefore able to more quickly make decisions as to how to interact with (e.g., grasp) objects than robots that employ conventional techniques.

In various implementations, a method may include the following operations: obtaining, from one or more sensors of a robot, sensor data that includes data indicative of an object observed in an environment in which the robot operates; processing the sensor data as input utilizing a first trained machine learning model to generate a first embedded feature vector, wherein the first embedded feature vector maps the data indicative of the object to an embedding space; identifying, for the first embedded feature vector, at least one nearest neighbor in the embedding space; identifying one or more semantic labels based at least in part on the at least one nearest neighbor, wherein the one or more semantic labels are associated with a pose; selecting a given grasp option from one or more enumerated grasp options previously associated with the pose; and operating the robot to interact with the object based on the pose and using the given grasp option.

This method and other implementations of technology disclosed herein may each optionally include one or more of the following features.

In various implementations, the method may further include determining an object class of the object based on the at least one nearest neighbor. In various implementations, In various implementations, the object class may include an object type. In various implementations, the object class may include the pose of the object. In various implementations, identifying the one or more semantic labels may include processing the first embedded feature vector as input utilizing a second trained machine learning model to generate a second embedded feature vector, and identifying the one or more semantic labels based on the second embedded feature vector. In various implementations, the second trained machine learning model may be selected from a plurality of candidate trained machine learning models based on the object class of the object. In various implementations, the plurality of candidate trained machine learning models may include at least some trained machine learning models that are trained to generate output indicative of respective predetermined poses of objects.

In various implementations, identifying the at least one nearest neighbor may include identifying an average of a plurality of nearest neighbors. In various implementations, the one or more sensors of the robot may include a vision sensor, and the sensor data may include one or more vision frames, and the data indicative of the object in the environment may include a depiction of the object in the one or more vision frames.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
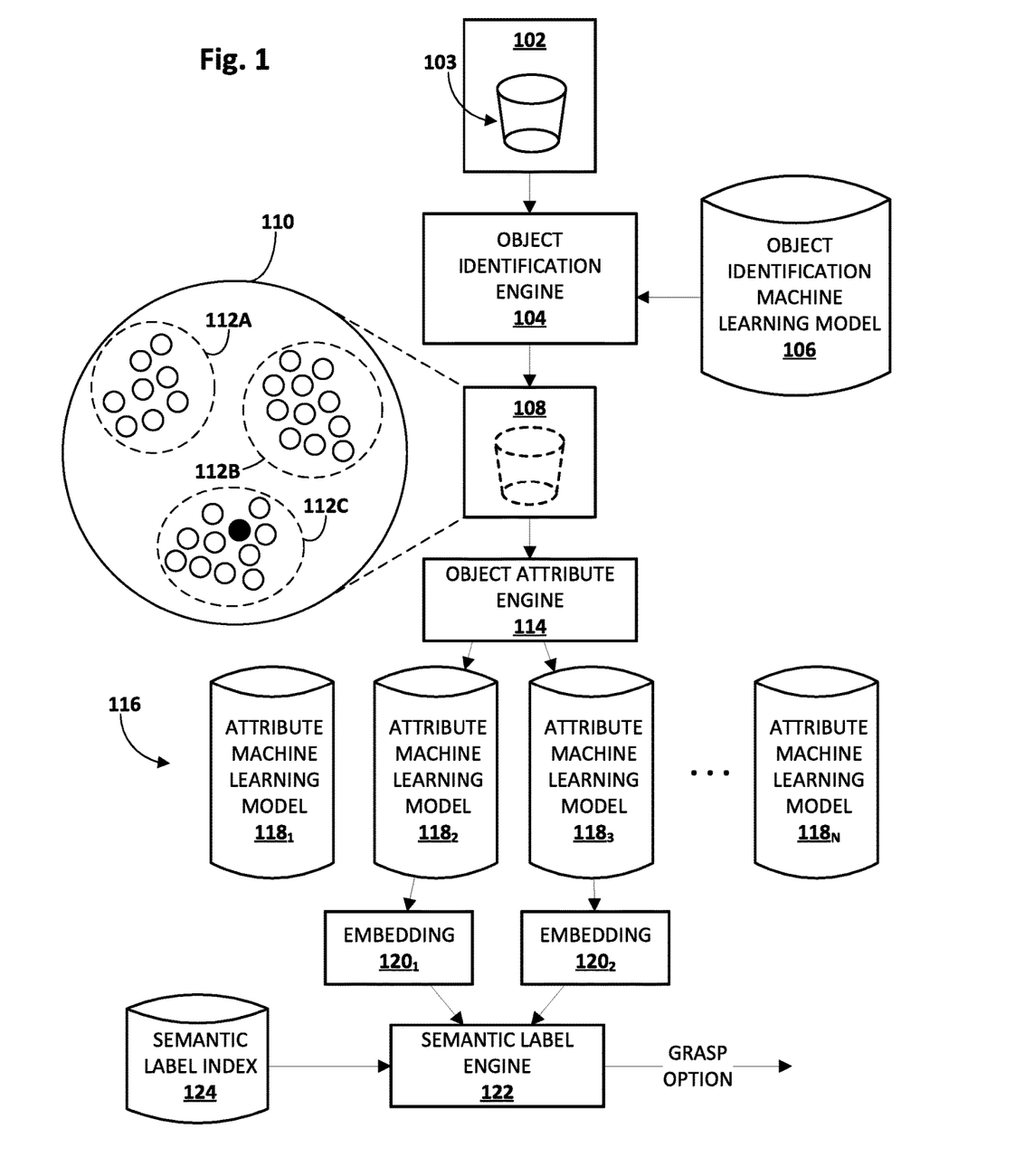
FIG. 1 depicts an example process flow, in accordance with various implementations.

FIG. 1 depicts one example of a process that may occur in accordance with various implementations. A one or more inputs 102 may be captured by one or more sensors (not depicted in FIG. 1) that may or may not be integral with a robot (not depicted in FIG. 1). Examples of sensors, such as vision sensors, will be described below. Inputs 102 may be captured by the robot, for instance, while the robot maneuvers around an area such as a home or office. In some implementations, each captured input 102 may take the form of a vision frame captured by a vision sensor of a robot, though this is not required. In FIG. 1, input 102 includes a vision frame that includes a depiction 103 of a cup. In various implementations, all or a portion of input 102 (e.g., only the portion depicting the cup, a vector of features extracted from input 102, etc.) may be processed, e.g., by an object identification engine 104, as input utilizing an object identification machine learning model 106 to generate output.

Machine learning models such as 106 and others depicted in FIG. 1 may come in various forms. In some implementations, these machine learning models may take the form of artificial neural networks, such as one or more convolutional neural networks. For example, object identification machine learning model 106 may comprise a neural network that is trained using training data that includes vision frames that are labeled with object types (e.g., cat, chair, car, cup, drawer, plate, etc.) depicted in the vision frames. The training data may be processed as input using object identification machine learning model 106 to generate output. The output may be compared to the labels associated with the training examples to determine differences/errors. Based on these differences/errors, various training techniques, such as back propagation and/or gradient descent (batch and/or stochastic) may be employed to alter hidden layer weights of the neural network.

In some implementations, once object identification machine learning model 106 is trained, it may be "cropped" so that instead of generating classification output (e.g., probabilities of a depicted object being one of x different object types), it generates an embedded feature vector, also referred to herein as an "embedding," that maps a depiction of an object in an input vision frame to an embedding space, such as embedding space 110.

Accordingly, in some implementations, the output of object identification engine 104 that is generated using object identification machine learning model 106 may take the form of an embedded feature vector 108 that comprises semantically-rich information about the depiction 103 of the object. For example, embedded feature vector 108 may map depiction 103 of the cup to embedding space 110. Embedding space 110 is depicted in two dimensions in FIG. 1 for the sake of brevity and clarity. However, this is not meant to be limiting. It should be understood that any embedding space described herein may have any number of dimensions.

In some implementations, embedding space 110 may be an object type classification embedding space in which embeddings are grouped into clusters of similar object types. In FIG. 1, for instance, three clusters, 112A-C, are depicted. Each embedding in each cluster 112 are represented by a white circle. A black circle represents a location of embedded feature vector 108 in object type classification embedding space 110. It can be seen that the nearest neighbors to embedded feature vector 108—which may be determined using Euclidean distances, dot products, cosine similarities, etc.—are found in third cluster 112C. Thus, embedded feature vector 108 is "closer to," and hence is more similar to, embeddings in third cluster 112C than it is to embeddings of clusters 112A and 112B.

As noted previously, in some implementations, various semantic information, e.g., contained in a semantic label index 124, may be mapped to embedding spaces described herein. This mapped semantic information may be used to make various classification decisions about objects, as well as decisions on how to interact with objects. As an example, in FIG. 1, one semantic label may be assigned to first cluster 112A (and/or to individual embeddings within first cluster 112A). A second semantic label may be assigned to second cluster 112B (and/or to individual embeddings within second cluster 112B). A third semantic label, e.g., of "cup," may be assigned to third cluster 112C (and/or to individual embeddings within third cluster 112C). Based on the third semantic label assigned to third cluster 112C in which embedded feature vector 108 is grouped, in various implementations, it may be determined that object depiction 103 should be classified as a cup. While three clusters 112 are depicted in FIG. 1, this is not meant to be limiting. It should be understood that an object type classification embedding space (e.g., 110) may (and indeed is likely to) include any number of clusters, depending on how many objects have been embedded into the space.

In various implementations, an object attribute engine 114 may be configured to determine, based on one or more semantic labels mapped to object type classification embedding space 110, an object type classification of the depiction 103 from input. In the example of FIG. 1, object attribute engine 114 may identify the semantic label "cup" based on the proximity of embedded feature vector 108 to embeddings of third cluster 112C in embedding space 110. Once object attribute engine 114 has identified this classification, in various implementations, object attribute engine 114 may select one or more trained machine learning models 118 from a library 116 of training machine learning models 118₁-ₙ in order to determine other attributes of the depicted object.

For example, a first attribute machine learning model 118₁ may be trained so that when utilized by object attribute engine 114 to process input (e.g., embedded feature vector 108, or the original vision frame 102), output is generated that is indicative of an object attribute. In some implementations, this output may take the form of one or more probabilities of the object having one or more respective attributes. Additionally or alternatively, in some implementations, the output may take the form of another embedded feature vector that maps to another embedding space (not depicted in FIG. 1) that is indexed or mapped with semantic labels. The same goes for the other machine learning models 118 of the library 116, with each being trained to generate embeddings that map to other embedding spaces that are indexed/mapped with semantic labels related to other object attributes.

Continuing with the cup example, suppose first attribute machine learning model 118₁ is trained to generate output, such as an embedded feature vector, that is indicative of an object having wings. Suppose second attribute machine learning model 118₂ is trained to generate output that is indicative of an object being full or empty (e.g., with fluid, solids, etc.). And suppose third attribute machine learning model 118₃ is trained to generate output that is indicative of an object having a top or no top (e.g., as would be applicable to cups, bottles, some bowls, cans, etc.). Since object attribute engine 114 was able to determine that the depiction 103 was of a cup, object attribute engine 114 may select only those downstream machine learning models 118 that are applicable to cups. Cups are not typically known for having or not having wings, so first attribute machine learning model 118₁ is not applicable. However, cups are known for being full/empty and for having or not having tops/lids. Accordingly, second attribute machine learning model 118₂ and third attribute machine learning model 118₃ are applicable.

Object attribute engine 114 may then select and process input using the selected one or more machine learning models 118 to generate output, e.g., in the form of one or more additional embeddings 120₁-120₂. First embedding 120₁ may be an embedded feature vector that maps to an embedding space, not depicted in FIG. 1, that is indexed and/or mapped with semantic labels or other semantic information indicative of whether an object is full or empty. Second embedding may be an embedded feature vector that maps to another embedding, also not depicted in FIG. 1, that is indexed and/or mapped with semantic labels or other semantic information indicative of whether an object has or lacks a top/lid.

In some implementations, semantic information such as semantic labels used to map and/or index these additional embedding spaces may also include other information. In some such implementations, this other information may include information about how a robot should interact with objects having various attributes. For example, the embedding space of first embedding 120₁ may include one cluster of embeddings associated with objects that are full, and another cluster of embeddings associated with objects that are empty. Other clusters may also be present, such as clusters of embeddings associated with objects that are half full, a quarter full, etc. If the cup depicted in the input vision frame (102) is full, then first embedding 120₁ may be more proximate to other embeddings associated with objects that are full, and less proximate embeddings associated with objects that are empty. This by itself allows for a determination that the depicted cup from input 102 is full.

However, as noted above, the embedding space to which first embedding 120₁ maps may also include other semantic information associated with, for instance, how a robot should interact with an object having particular attributes. For example, one or more embeddings of the cluster of embeddings associated with objects that are full may be labeled with semantic labels, e.g., contained in semantic label index 124, that include enumerated lists of grasp options that may be employed by a robot when interacting with a full object. In various implementations, a semantic label engine 122 may identify semantic labels from semantic label index 124 that are associated with one or more nearest neighbor embeddings to first embedding 120₁. Based on these identified semantic labels, semantic label engine 122 may compile a list of candidate grasp options for the robot to employ to interact with a full cup. For example, the grasp options for a full object may include grasping from the side.

Similarly, one or more embeddings of a cluster of embeddings associated with objects that have open tops may be labeled with semantic labels, e.g., contained in semantic label index 124, that include enumerated lists of grasp options that may be employed by a robot when interacting with an object that with an open/closed top. In various implementations, semantic label engine 122 may identify semantic labels from semantic label index 124 that are associated with one or more nearest neighbor embeddings to second embedding 120₂. Based on these identified semantic labels, semantic label engine 122 may compile a list of candidate grasp options for the robot to employ to interact with a cup having no top. For example, the grasp options for an object without a top may include grasping from the side, grasping from the top across the diameter of the object, and grasping an exposed lip at the object's top perimeter.

In some implementations, semantic label engine 122 may assemble an intersection of the sets of grasp options determined from semantic labels based on first embedding 120₁ and second embedding 120₂. In some implementations, this intersection set may also include grasp options determined from semantic labels (e.g., stored in semantic label index 124) associated with embeddings in the object type embedding space 110. For example, cups may be graspable from the side, from the top (by grabbing across the diameter and/or grabbing a lip), from the bottom, etc. One or more grasp options contained in this intersection set may be provided, e.g., by semantic label engine 122, as output, e.g., to a robot controller.

The robot controller may then select one or more of the grasp options to employ when interacting with the cup. In this example, the only grasp option contained in both sets determined from embeddings 120₁₋₂ is the grasping from the side option, so that is the option the robot may employ. Intuitively, grasping a full cup with no top is most safely done from the side, because grasping a full cup from the top or bottom, especially from the lip, may lead to instability and increase the likelihood that the robot will drop the cup or at least spill some of its contents.

Figure 2:
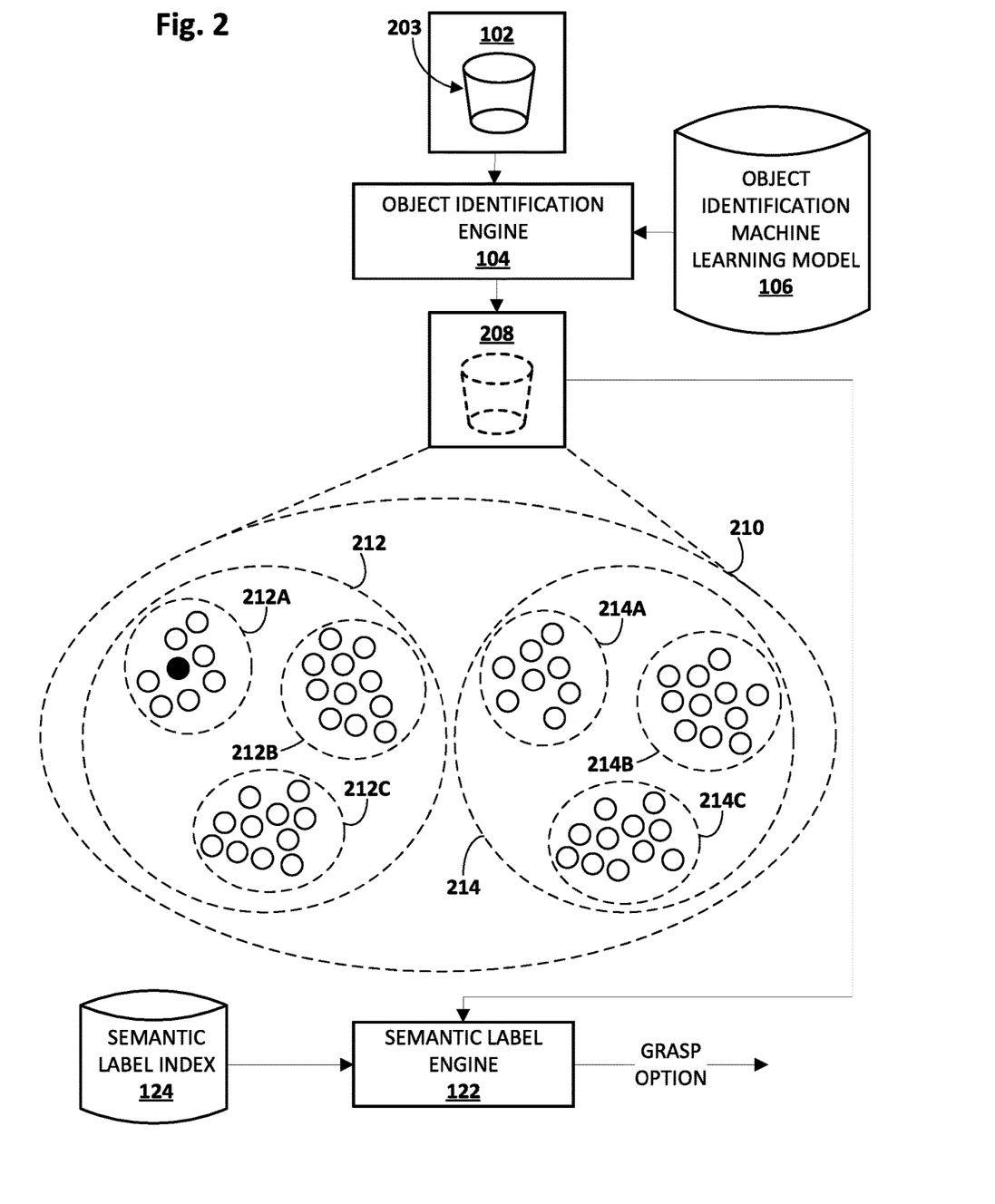
FIG. 2 depicts another example process flow, in accordance with various implementations.

FIG. 2 depicts an alternative implementation to that of FIG. 1. Many aspects of FIG. 2 are the same as FIG. 1. For example, an input 202 takes the form of a vision frame captured by a robot vision sensor that once again includes, for purposes of explanation and not limitation, a depiction 203 of a cup. As was the case in FIG. 1, input 202 is processed as input by object identification engine 104 using object identification machine learning model 106 to generate output in the form of an embedded feature vector 208.

However, in FIG. 2, the embedded feature vector 208 maps depiction 203 of the cup to an object identification embedding space 210 that is semantically richer than 110 of FIG. 1. Embedded feature vector 208 is once again usable to determine an object type classification of the depicted object. However, in addition to an object type, embedded feature vector 208 also indicates other attributes of the object, such as its pose (e.g., standing upright, tipped over, upside down, etc.) and/or configuration (e.g., top, no top, filled, empty, etc.), all by virtue of its embedding into the semantically rich embedding space 210.

For example, a first "supercluster" 212 in embedding space 210 may be associated with a first semantic label identifying a first object type classification (e.g., "cup"), which as noted above may be stored in semantic label index 124. Similarly, a second supercluster 214 may be associated with a different semantic label identifying a second object type classification, such as "chair." Only two object type superclusters are depicted in FIG. 2, but it should be understood that any number of object type superclusters may (and likely will) be present, depending on the number and variety of object depictions that have been embedded into embedding space 210.

Within first supercluster 212 there are three sub clusters, 212A-C. These sub clusters 212 may correspond to groups of cups that have similar attributes. For example, first sub cluster 212A of supercluster 212 may include embeddings generated from depictions of cups that are standing upright. Second sub cluster 212B of supercluster 212 may include embeddings generated from depictions of cups that are full. Third sub cluster 212C of supercluster 212 may include embeddings generated from depictions of cups that are tipped over. And of course, there may be any number of other sub clusters within the supercluster 212 that represent other potential attributes (e.g., poses, configurations) of cups, such as having open tops, closed tops, handles, various shapes, etc.

Within second supercluster 214 there are also three sub clusters, 214A-C. These sub clusters 214 may correspond to groups of chairs that have similar attributes. For example, first sub cluster 214A of supercluster 212 may include embeddings generated from depictions of chairs that are standing upright. Second sub cluster 214B of supercluster 214 may include embeddings generated from depictions of chairs with wheels on the bottom (this information may be used by a robot to influence how it might move a chair). Third sub cluster 214C of supercluster 214 may include embeddings generated from depictions of chairs that are tipped over. And once again there may be any number of other sub clusters within the supercluster 214 that represent other potential attributes (e.g., poses, configurations) of chairs, such as having arm rests, being recline-able, having cushions, etc.

In various implementations, individual embeddings and/or regions of embedding space 210 may be associated with semantic labels, e.g., stored in semantic label index 124. For example, first sub cluster 212A of supercluster 212 (e.g., as a whole or by way of its individual embeddings) may be associated with one or more semantic labels that indicate a cup pose of "standing upright." Additionally, in some implementations, the one or more semantic labels may include information that is usable by a robot to interact with standing-upright cups. For example, the semantic label(s) may include grasp options that are exercisable by a robot when interacting with an upright cup. Similar semantic labels may be associated with other sub clusters of super clusters 212 and 214.

When the depiction 203 of input 102 is processed using object identification machine learning model 106, the generated embedded feature vector 208 may map the depiction to embedding space 210, which as noted above is more semantically rich than that of FIG. 1. The single black dot in first sub cluster 212A of supercluster 212 represents a coordinate of embedded feature vector 208 in embedding space 210. Based on its location and its nearest neighbors, it can be determined, e.g., from the aforementioned semantic labels used to index embedding space 210, that the depicted object is an empty cup that is standing upright. If the embedding were positioned relatively equidistant to both first sub cluster 212A (standing upright) and second sub cluster 212B (full), then semantic labels from both clusters may be applied to determine that the depicted cup is both standing upright and filled with something.

Unlike in FIG. 1 in which a pipeline of machine learning models was effectively applied at least in part in series to determine attributes of the depiction 103, in FIG. 2, a single machine learning model (i.e. object identification machine learning model 106) was applied to generate an embedded feature vector 208 that maps to a semantically rich embedding space 210. Semantic labels associated with embedding space 210 may then be used to determine that the depiction 203 is a cup that is standing upright (as opposed to, for instance, tipped over), and that the cup is not full. Grasp options that might be semantically associated with an upright cup include, for instance, grasping from the side, grasping from the top by pinching a lip of the cup, grasping from the top across a diameter of the cup, grasping from the bottom, etc.

Semantic label engine 122 may once again be configured to identify one or more semantic labels, e.g., from semantic label index 124, that are associated with one or more nearest neighbors of embedded feature vector 208 within embedding space 210. As noted above, the semantic labels may be associated with individual embeddings, with clusters of embeddings (e.g., 212A, 212B, 212C), with an average or other statistic computed from multiple embeddings (e.g., a centroid), and so forth. From these identified semantic labels, semantic label engine 122 may provide one or more grasp options as output, e.g., to a robot controller (not depicted).

In some implementations, new semantic labels may be added to semantic label index 124, e.g., in association with new embeddings generated for embedding space 210. For example, in some implementations, if a robot is able to successfully interact with an object based on grasp options determined from semantic labels associated with nearest neighbor embeddings, the current embedding may be labeled, e.g., in semantic label index 124, with similar semantic labels. Additionally or alternatively, if the robot was not successful, in some implementations, one or more grasp options associated with one or more semantic labels may be eliminated, or may have their associated "confidence measures" reduced. These confidence measures may be used, for instance, if multiple grasp options are output by semantic label engine 122, so that semantic label engine 122 and/or the robot is able to select from multiple candidate grasp options.

Figure 3:
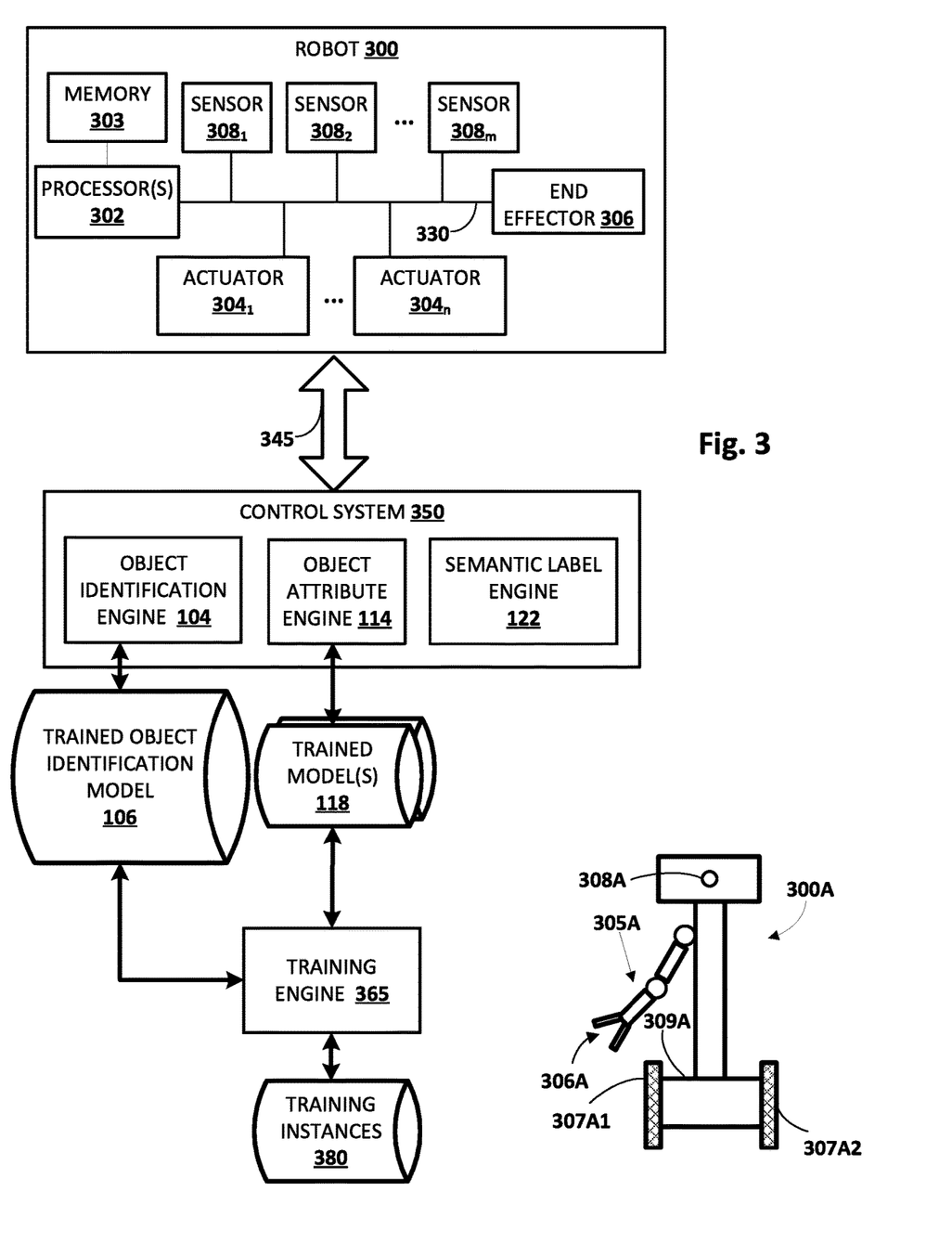
FIGS. 3 and 4 schematically depict an example environment in which disclosed techniques may be employed, in accordance with various implementations.

FIG. 3 illustrates an example environment in which various techniques disclosed herein may be implemented. A robot 300 is illustrated in FIG. 3. Robot 300 may take various forms, including but not limited to a telepresence robot, a robot arm, a humanoid, an animal, an insect, an aquatic creature, a wheeled device, a submersible vehicle, an unmanned aerial vehicle ("UAV"), and so forth. In various implementations, robot 300 may include one or more processors 302. Processor(s) 302 may take various forms, such as one or more CPUs, one or more GPUs, one or more field-programmable gate arrays ("FPGA"), and/or one or more application-specific integrated circuits ("ASIC"). In some implementations, the processor(s) 302 may be operably coupled with memory 303. Memory 303 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, processor(s) 302 may be operably coupled with one or more actuators $304_{1-n}$, at least one end effector 306, and/or one or more sensors $308_{1-m}$, e.g., via one or more buses 310. The robot 300 may have multiple degrees of freedom and each of the actuators $304_{1-n}$ may control actuation of the robot 300 within one or more of the degrees of freedom responsive to control commands. The control commands are generated by one or more of the processor(s) 302 and provided to the actuators $304_{1-n}$ (e.g., via one or more of the buses 310) to control the robot 300. As used herein, "actuator" encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

As used herein, "end effector" may refer to a variety of tools that may be operated by robot 300 in order to accomplish various tasks. For example, some robots may be equipped with an end effector 306 that takes the form of a claw with two opposing "fingers" or "digits." Such a claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, containers, trays, and so forth. In some implementations, end effector 306 may be removable, and various types of modular end effectors may be installed onto robot 300, depending on the circumstances.

Sensors $308_{1-m}$ may take various forms, including but not limited to vision components (e.g., laser scanners, stereographic cameras, monographic cameras), force sensors, pressure sensors, pressure wave sensors (e.g., microphones), proximity sensors (also referred to as "distance sensors"), torque sensors, barcode readers, radio frequency identification ("RFID") readers, accelerometers, gyroscopes, compasses, position sensors (e.g., odometer, a global positioning system), speedometers, edge detectors, and so forth. While sensors $308_{1-m}$ are depicted as being integral with robot 300, this is not meant to be limiting. In some implementations, sensors $308_{1-m}$ may be located external to, but may be in direct or indirect communication with, robot 300.

Also illustrated in FIG. 3, is a robot 300A, which is one non-limiting example of robot 300. The robot 300A includes robot arm 305A with a grasping end effector 306A, that takes the form of a gripper with two opposing actuable members. The robot 300A also includes a base 309A with wheels 307A1 and 307A2 provided on opposite sides thereof for locomotion of the robot 300A. The base 309A may include, for example, one or more motors for driving corresponding wheels 307A1 and 307A2 to achieve a desired direction, velocity, and/or acceleration of movement for the robot 300A.

The robot 300A also includes a vision component 308A. The vision component 308A includes one or more vision sensors and may be, for example, a stereographic camera, a monographic camera, or a laser scanner. Vision data (e.g., vision frames) described herein can be generated based on output from vision sensor(s) of the vision component 308A. For example, the output can be raw output from the vision sensor(s), or processed output. In some implementations, a stereographic camera includes two or more sensors (e.g., charge-coupled devices (CCDs)), each at a different vantage point. Vision data can be generated based on sensor data generated by the two sensors at a given instance, such as vision data that is a two-and-a-half-dimensional ("2.5D") (2D with depth) image, where each of the pixels of the 2.5D image defines an X, Y, and Z coordinate of a surface of a corresponding object, and optionally color values (e.g., R, G, B values) and/or other parameters for that coordinate of the surface. In some other implementations, a stereographic camera may include only a single sensor and one or more mirrors utilized to effectively capture sensor data from two different vantage points. A monographic camera can include a single sensor and captures two-dimensional ("2D") vision data. A laser scanner includes one or more lasers that emit light and one or more sensors that generate vision sensor data related to reflections of the emitted light. The vision data generated based on sensor output from a laser scanner may be 2.5D point cloud data. A laser scanner may be, for example, a time-of-flight laser scanner or a triangulation based laser scanner and may include a position sensitive detector (PSD) or other optical position sensor. In some implementations, vision data can be a voxel map as described herein. In some of those implementations, the voxel map is generated by processing of multiple instances of vision data. For example, multiple 2.5D images and/or multiple 2.5D instances of point cloud data from multiple different vantages can be processed to generate a voxel map of at least a portion of an environment of a robot.

As described herein, robot 300A may operate autonomously at least part of the time and control actuators thereof in performance of various actions. For example, in performing various actions, one or more processors of the robot 300A may provide control commands to actuators associated with the wheels 307A1 and/or 307A2, the robot arm 305A and/or the end effector 306A. Further, in various situations the control commands provided at a given instance can be generated based at least in part on object detection as described herein.

Control system 350 is also illustrated in FIG. 3. Control system 350 includes the aforementioned object identification engine 104, the aforementioned object attribute engine 114, and the aforementioned semantic label engine 122. Although the control system 350 is illustrated separate from the robot 300 in FIG. 3, connection arrow 345 indicates that the control system 350 can be implemented on robot 300 and/or can be in network communication (e.g., via a local area network and/or a wide area network) with robot 300. For example, in some implementations, one or more (e.g., all) of the engines of the control system 350 are implemented by hardware that is local to the robot 300, such as one or more of the processors 302. Such processor(s) that implement one or more of the engines may optionally be separate from the processor(s) that generate and/or provide control commands to actuators 304 of the robot 300. For example, aspects of the control system 350 may be implemented by one or more processors that do not operate in a real-time domain of the robot 300, whereas other processor(s) that do operate in the real-time domain generate and provide control commands to actuators 304$_{1-n}$. In some implementations, one or more (e.g., all) of the engines of the control system 350 are implemented by hardware that is separate from the robot 300. For example, engine(s) may be implemented "in the cloud" by a remote cluster of high performance computing devices and/or by one or more computing devices that are separate from the robot 300, but that are geographically proximal to the robot (e.g., in the same building). In implementations where robot 300 and one or more aspects of control system 350 are separate, they may communicate over one or more wired or wireless networks (not depicted) or using other wireless technology, such as radio, Bluetooth, infrared, etc.

In various implementations, the object identification engine 104 receives input (e.g., 102), e.g., vision frames, that is generated based on output from, for instance, one or more vision components of the sensors 308$_{1-m}$. The object identification engine 104 uses the aforementioned trained object identification model 106 to process the received vision data to generate output that is indicative of an object type classification for one or more objects captured by the vision data. For example, the received vision data can be a 2.5D vision frame and object identification engine 104 can process the vision frame using trained object identification model 106 to generate output in the form of an embedded feature vector (e.g., 108, 208) that maps the depicted object to an object type embedding space (e.g., 110, 210).

Object attribute engine 114 may receive input, which may include the embedded feature vector generated by object identification engine 104 and/or "raw" sensor data, e.g., vision frames, that is generated based on output from one or more of the sensors 308$_{1-m}$. The object attribute engine 114 uses the object type classification determined from the output of object identification engine 104 to select one or more attribute machine learning models 118. The selected attribute machine learning model(s) are then used to process the input to generate output that, for instance, includes embeddings (i.e., embedded feature vectors) that are usable to determine various attributes (e.g., pose, configuration) of the depicted object, as described above.

Figure 4:
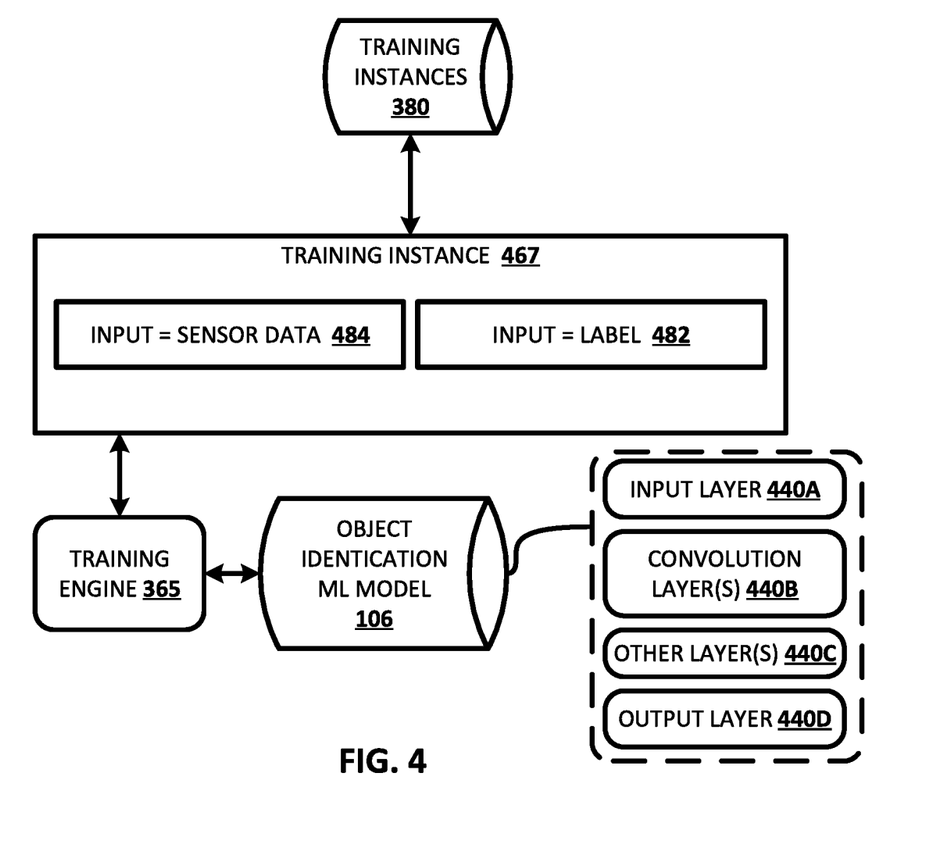

Also illustrated in the environment of FIG. 3 is a training engine 365 and training instances 380. The trained object identification model 106 and/or attribute machine learning model(s) 118 can be trained by the training engine 365 utilizing training instances 380. With reference to FIG. 4, additional description is provided of the training engine 365, the training instances 380, and the trained object identification model 106. Similar techniques may be used to train attribute machine learning network(s) 118.

FIG. 4 illustrates an example training instance 467 of the training instances 380, and how the training engine 365 can utilize the training instance 467 to train the object identification model 106, which in this example may be a neural network such as a convolutional neural network. The training instance 467 includes a first training instance input 482 that includes a label identifying an object type and a second training instance input 484 that includes sensor data indicative of (e.g., depicting) the object. As noted previously, the sensor data 484 of training instance input 467 can be, for example, a 2D vision frame, a 2.5D vision frame, or a 3D voxel map. For example, the vision data can be a 2.5D vision frame captured by a stereo camera and have, for example, 312×312 pixels with four channels. The four channels can define red, green, blue, and depth values for each of the pixels. As another example, the vision data can be a 3D voxel map generated based on sensor output captured by a stereo camera and/or laser scanner from multiple vantages.

In training the object identification model 106, the training engine 365 applies the training instance input, 482 and 484, to object identification model 106, and processes the training instance input 467, utilizing object identification model 106 and based on current parameters of object identification model 106, to generate an output. The training engine 365 then compares the generated output to the training instance label 482, and updates one or more parameters of object identification model 106 based on the comparison. For example, the training engine 365 can generate an error based on differences between the generated output and the training instance label 482, and backpropagate the error through object identification model 106 to update the model. Although only a single training instance 467 is illustrated in FIG. 4, object identification model 106 will likely be trained based on a large quantity of training instances. Those training instances can collectively include training instance input with diverse vision data (e.g., multiple diverse objects, varied lighting/other environmental parameters, etc.). Moreover, although a non-batch training example is described, batch training may additionally or alternatively be utilized.

FIG. 4 also illustrates, within dashed lines, example layers that may be included in object identification model 106. In particular, an input layer 440A, convolution layer(s) 440B, other layer(s) 440C, and an output layer 440D are illustrated. As described herein, the dimensions/shape of the input layer 440A can be dependent on the shape of the vision data to be applied. In some implementations, multiple convolution layer(s) 440B are provided, and max pooling and/or other layers may optionally be interposed between one or more of the convolution layer(s) 440B. The other layer(s) 440C can include such max pooling layers and/or layers such as a softmax layer(s) and/or fully connected layer(s) that precede the output layer 440D.

Figure 5:
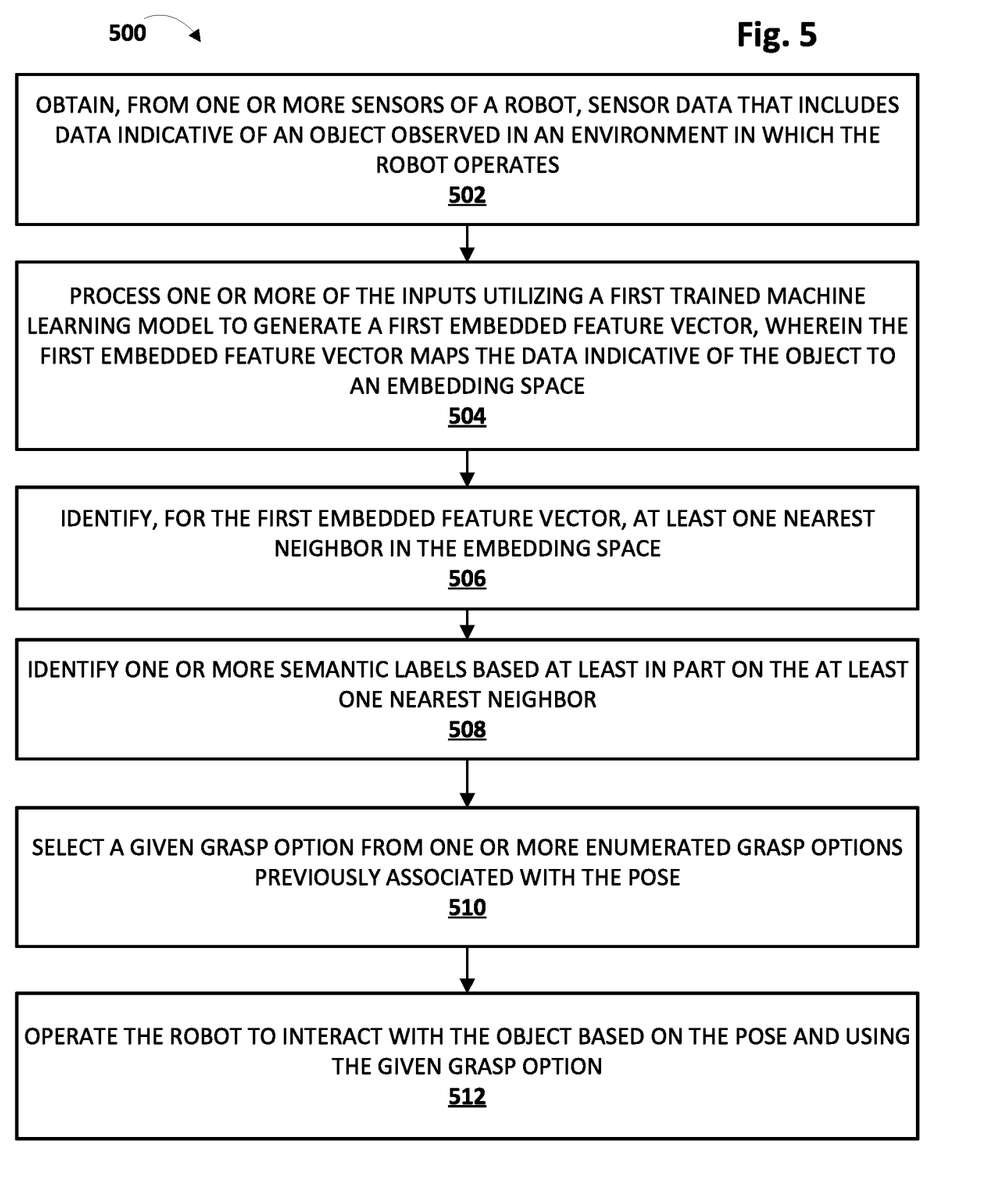
FIG. 5 depicts an example method for practicing selected aspects of the present disclosure, in accordance with various implementations.

FIG. 5 depicts an example method 500 for practicing selected aspects of the present disclosure, in accordance with various implementations. For convenience, the operations of the flow chart are described with reference to a system that performs the operations. This system may include various components of various computer systems described herein. Moreover, while operations of method 500 are shown in a particular order, this is not meant to be limiting. One or more operations may be reordered, omitted or added.

At block 502, the system may obtain, e.g., from one or more sensors (e.g., 308) of a robot (e.g., 300), sensor data that includes data indicative of an object observed in an environment in which the robot operates. For example, in some implementations, the one or more sensors may include a vision sensor that generates various types of vision data/frames as described above, such as a 2.5D image, a point cloud, etc. In other implementations, the one or more sensors used to generate the data may be separate from the robot, e.g., as standalone sensors deployed in the environment, integral with a control system 350, etc.

At block 504, the system, e.g., by way of object identification engine 104, may process one or more of the inputs utilizing a first trained machine learning model, e.g., object identification model 106, to generate a first embedded feature vector (e.g., 108, 208). In various implementation, the first embedded feature vector maps the data indicative of the object, such as depiction 103/203, to an embedding space, such as embedding spaces 110 or 210.

At block 506, the system may identify, for the first embedded feature vector, at least one nearest neighbor (embedding) in the embedding space. For example, the system may identify the x nearest neighbors, wherein x is a positive integer. In some implementations, identification of the one or more nearest neighbors may yield a cluster of embeddings that are all semantically similar to the first embedded feature vector.

At block 508, the system, e.g., by way of object attribute engine 114 and/or semantic label engine 122, may identify, e.g., from semantic label index 124, one or more semantic labels based at least in part on the at least one nearest neighbor. For example, in some implementations, the system may determine an object class of the object based on the at least one nearest neighbor. In various implementations, the object class may include, for instance, an object type (e.g., cup, chair, scissors, plate, bowl, vase, bottle, wine glass, vacuum cleaner, broom, etc.), a pose of the object (standing upright, tipped over/laying down, upside down), and/or a configuration of the object (e.g., top or no top, handle or no handle, etc.). Additionally or alternatively, in some implementations, one or more of the semantic labels may be associated with one or more enumerated grasp options that can be used by a robot to interact with an object having an attribute associated with the semantic label.

In some implementations, identifying the one or more semantic labels may further include processing the first embedded feature vector (or the original input vison frame) as input utilizing a second trained machine learning model (or any number of additional trained attribute machine learning models 118) to generate a second (and/or additional) embedded feature vector. In various implementations, the one or more semantic labels may be identified based on the second embedded feature vector (and/or based on addition embedded feature vectors), as was described with respect to FIG. 1.

At block 510, the system may select a given grasp option from one or more enumerated grasp options previously associated with one or more semantic labels identified at block 508. In some implementations, the one or more grasp options may be associated with a pose conveyed by the one or more semantic labels. Examples of grasp options that are suitable for interaction with cups (e.g., full, empty, open top) were described previously. In some implementations, multiple sets of grasp options may be identified based on multiple semantic labels, and an intersection of the grasp options may be selected as usable by a robot to interact with the object. At block 512, the system may operate the robot to interact with the object based at least on the given grasp option.

Figure 6:
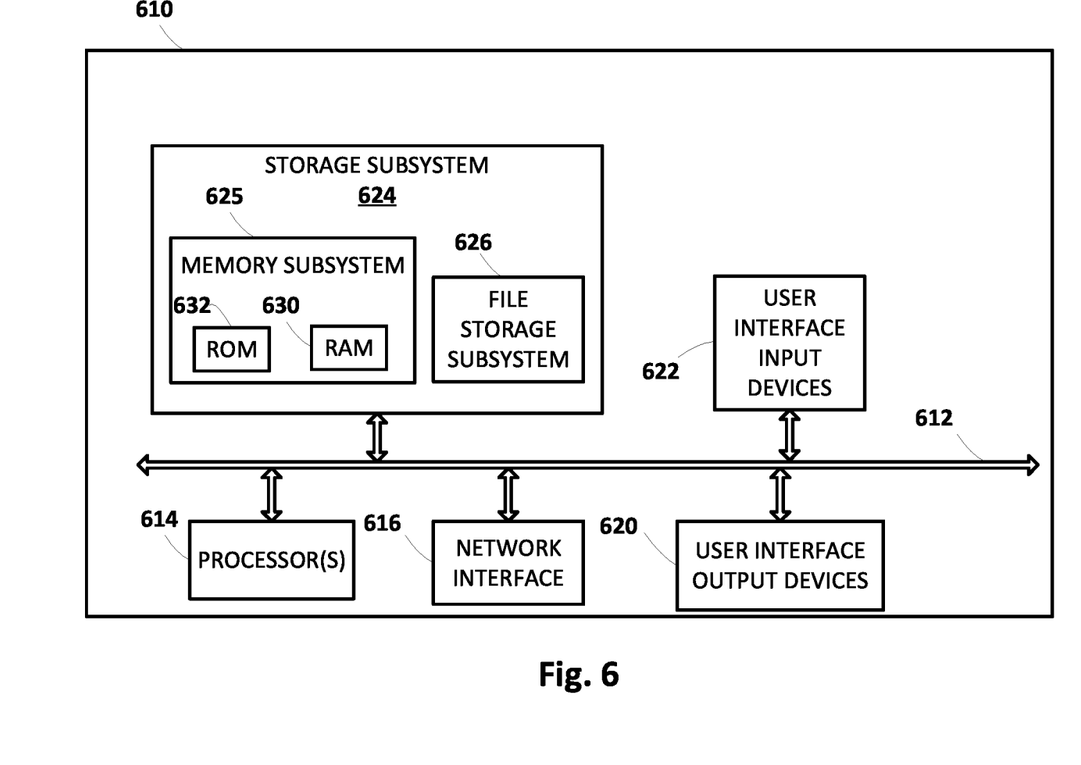
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules and/or engines described herein. For example, the storage subsystem 624 may include the logic to perform selected aspects of method 500, and/or to implement one or more components depicted in the various figures. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a CD-ROM drive, an optical drive, or removable media cartridges. Modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   obtaining, from one or more sensors of a robot, sensor data that includes data indicative of an object observed in an environment in which the robot operates;
   processing the sensor data as input utilizing a first trained machine learning model to generate a first embedded feature vector, wherein the first embedded feature vector maps the data indicative of the object to an embedding space;
   identifying, for the first embedded feature vector, at least one nearest neighbor embedded feature vector in the embedding space;
   identifying one or more semantic labels based at least in part on the at least one nearest neighbor, wherein the one or more semantic labels are associated with a pose;
   selecting a given interaction option from one or more enumerated interaction options previously associated with the pose; and
   operating the robot to interact with the object based on the pose and using the given interaction option.

2. The method of claim 1, further comprising determining an object class of the object based on the at least one nearest neighbor embedded feature vector.

3. The method of claim 2, wherein the object class comprises an object type.

4. The method of claim 2, wherein the object class comprises the pose of the object.

5. The method of claim 2, wherein identifying the one or more semantic labels includes processing the first embedded feature vector as input utilizing a second model to generate a second embedded feature vector, and identifying the one or more semantic labels is based on the second embedded feature vector.

6. The method of claim 5, wherein the second model is selected from a plurality of candidate models based on the object class of the object.

7. The method of claim 1, wherein the one or more enumerated interaction options include one or more grasp options.

8. The method of claim 1, wherein identifying the at least one nearest neighbor embedded feature vector comprises identifying an average of a cluster of nearest neighbor embedded feature vectors.

9. The method of claim 1, wherein the semantic label was previously associated with a cluster of embedded feature vectors in the embedding space.

10. A method implemented by one or more processors, comprising:
    obtaining, from one or more sensors, sensor data that includes data indicative of an object observed in an environment in which a robot operates;
    processing data indicative of the sensor data as input utilizing a first machine learning model to generate an embedded feature vector, wherein the embedded feature vector maps the data indicative of the object to an embedding space;
    identifying, based on the embedded feature vector, an object type of the object, wherein the object type is determined from a semantic label associated with at least one nearest neighbor embedded feature vector in the embedding space;
    identifying a second machine learning model based at least in part on the object type;
    processing the same data indicative of the sensor data or different data indicative of the sensor data using the second machine learning model to determine a pose of the object;
    selecting a given interaction option from one or more enumerated interaction options previously associated with the pose; and
    operating the robot to interact with the object using the given interaction option.

11. The method of claim 10, wherein the one or more enumerated interaction options include one or more grasp options.

12. The method of claim 10, wherein the processing using the second machine learning model comprises generating an additional embedded feature vector, wherein the additional embedded feature vector maps the data indicative of the object to another embedding space.

13. The method of claim 12, wherein the pose is determined from a semantic label previously assigned to a portion of the another embedding space.

14. A system comprising one or more processors and memory operably coupled with the one or more processors, wherein the memory stores instructions that, in response to execution of the instructions by one or more processors, cause the one or more processors to:
    obtain, from one or more sensors of a robot, sensor data that includes data indicative of an object observed in an environment in which the robot operates;
    process the sensor data as input utilizing a first machine learning model to generate a first embedded feature vector, wherein the first embedded feature vector maps the data indicative of the object to an embedding space;
    identify, for the first embedded feature vector, at least one nearest neighbor embedded feature vector in the embedding space;
    identify one or more semantic labels based at least in part on the at least one nearest neighbor, wherein the one or more semantic labels are associated with a pose;
    select a given interaction option from one or more enumerated interaction options previously associated with the pose; and
    operate the robot to interact with the object based on the pose and using the given interaction option.

15. The system of claim 14, further comprising determining an object class of the object based on the at least one nearest neighbor embedded feature vector.

16. The system of claim 15, wherein the object class comprises an object type.

17. The system of claim 15, wherein the object class comprises the pose of the object.

18. The system of claim 15, wherein identifying the one or more semantic labels includes processing the first embedded feature vector as input utilizing a second model to generate a second embedded feature vector, and identifying the one or more semantic labels is based on the second embedded feature vector.

19. The system of claim 18, wherein the second model is selected from a plurality of candidate models based on the object class of the object.

20. The system of claim 14, wherein the one or more enumerated interaction options include one or more grasp options.

* * * * *